US012231491B1

(12) United States Patent
Song et al.

(10) Patent No.: US 12,231,491 B1
(45) Date of Patent: Feb. 18, 2025

(54) EFFICIENT SERVERLESS METHOD AND SYSTEM OF SERVING ARTIFICIAL INTELLIGENCE MODELS

(71) Applicant: INTERNATIONAL BUSINESS MACHINES CORPORATION, Armonk, NY (US)

(72) Inventors: Bo Song, Xian (CN); Jun Wang, Xian (CN); Dong Hai Yu, Xian (CN); Yao Dong Liu, Xian (CN); Xiao Ming Ma, Xian (CN); Jiang Bo Kang, Xian (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/509,247

(22) Filed: Nov. 14, 2023

(51) Int. Cl.
*H04L 67/1008* (2022.01)
*H04L 41/16* (2022.01)
*H04L 67/1012* (2022.01)

(52) U.S. Cl.
CPC .......... *H04L 67/1008* (2013.01); *H04L 41/16* (2013.01); *H04L 67/1012* (2013.01)

(58) Field of Classification Search
CPC .. H04L 67/1008; H04L 41/16; H04L 67/1012
See application file for complete search history.

(56) References Cited

U.S. PATENT DOCUMENTS

| | | | |
|---|---|---|---|
| 9,317,435 B1* | 4/2016 | Bairavasundaram | ........................ G06F 12/0868 |
| 11,082,301 B2* | 8/2021 | Baughman | ............ H04L 41/147 |
| 11,556,791 B2* | 1/2023 | Prabhudesai | ....... G06F 11/3409 |
| 11,729,317 B1* | 8/2023 | Ahani | ..................... G06N 20/00 |
| | | | 379/265.09 |
| 11,863,466 B2* | 1/2024 | Brown | .................... H04L 47/83 |

(Continued)

FOREIGN PATENT DOCUMENTS

CN  112083932 A  12/2020

OTHER PUBLICATIONS

Nunnagopula et al., "Website Traffic Forecasting Using Deep Learning Techniques," 2023 International Conference on Artificial Intelligence and Smart Communication (AISC) (pp. 531-536) (Year: 2023).*

(Continued)

*Primary Examiner* — Oanh Duong
(74) *Attorney, Agent, or Firm* — Intelletek Law Group, PLLC; Gabriel Daniel, Esq.

(57) ABSTRACT

A method for forecasting server demand includes collecting a historical number of scoring requests from a network using a serverless architecture. A scoring request capacity per server is determined using the historical number of scoring requests. A prediction model predicts a first future value of scoring requests for a first future time span. A current number of servers in a pool of servers handling the scoring requests. Using the prediction model, a determination of whether the current number of servers is capable of handling the first future value of scoring requests for the first future time span is made. Upon determining that the current number of servers is incapable of handling the first future value of scoring requests, one or more additional servers are warmed up. The warmed-up additional servers are added to the pool of servers prior to an arrival of the first future time span.

20 Claims, 4 Drawing Sheets

(56) References Cited

U.S. PATENT DOCUMENTS

2021/0184941 A1\* 6/2021 Tootaghaj ................ G05B 6/02
2021/0184942 A1  6/2021 Tootaghaj
2022/0092480 A1  3/2022 Mahadik
2022/0400086 A1\* 12/2022 Nandy .................. H04L 47/805

OTHER PUBLICATIONS

Puliyadi, A. et al., "A Time Series Forecasting Approach to Minimize Cold Start Time in Cloud-Serverless Platform", arXiv:2206.15176v1 [cs.NI] (2022), 20 pgs.
Schuler, L. et al., "AI-based Resource Allocation: Reinforcement Learning for Adaptive Auto-scaling in Serverless Environments", autoarXiv:2005.14410v1 [cs.DC] (2020), 8 pgs.
Bhattacharjee, A. et al., "BARISTA: Efficient and Scalable Serverless Serving System for Deep Learning Prediction Services", ResearchGate (2019), 12 pgs.
Nguyen, T. "Managing Cold-start in The Serverless Cloud with Temporal Convolutional Networks", arXiv:2304.00396v1 [cs.DC] (2023), 8 pgs.
Lin, P. et al., "Mitigating Cold Starts in Serverless Platforms", arXiv:1903.12221v1 [cs.DC] (2019), 5 pgs.

\* cited by examiner

EFFICIENT SERVERLESS METHOD AND SYSTEM OF SERVING ARTIFICIAL INTELLIGENCE MODELS

BACKGROUND

Technical Field

The present disclosure generally relates to computer networks, and more particularly, to an efficient serverless method and system of serving artificial intelligence models.

Description of the Related Art

Serverless computing is a cloud computing application development and execution model that enables developers to build and run application code without provisioning or managing servers or backend infrastructure. A serverless system allows developers to put all their focus into writing front-end application code and business logic. Developers may only need to write their application code and deploy the code to containers managed by a cloud service provider. The cloud service provider handles the rest, which may include provisioning the cloud infrastructure to run the code and scaling the infrastructure up and down on demand as needed. The cloud service provider is also generally responsible for routine infrastructure management and maintenance such as operating system updates and patches, security management, capacity planning, system monitoring, and more.

Serverless is one of the popular cloud-native computing models. Backend services are provided on an as-used basis. The service is auto-scaling, so users do not need to allocate a fixed maximum number of servers in operation. Using a serverless system is very suitable for serving artificial intelligence (AI) models in many fields, for example, credit card fraud and e-commercial trade, where request traffic is time sensitive. The traffic for weekend requests through a network is typically heavier than on weekdays. Similarly, network traffic during days includes more requests than nights. Traffic around midnight is generally lighter. Traffic server loads may be at their peak for the year during holiday shopping. In order to cost-effectively serve AI models handling network requests, deploying the maximum number of servers may be unnecessary. A serverless system may inherently resolve such problems related to varying traffic.

SUMMARY

According to an embodiment of the present disclosure, a computer program product for forecasting server demand includes one or more computer readable storage media, and program instructions collectively stored on the one or more computer readable storage media. The program instructions include collecting a historical number of scoring requests from a network using a serverless architecture. A scoring request capacity per server is determined using the historical number of scoring requests. A prediction model predicts a first future value of scoring requests for a first future time span. A current number of servers in a pool of servers handling the scoring requests. Using the prediction model, a determination of whether the current number of servers is capable of handling the first future value of scoring requests for the first future time span is made. In the event the current number of servers is incapable of handling the first future value of scoring requests, one or more additional servers are warmed up. The warmed-up additional servers are added to the pool of servers prior to an arrival of the first future time span.

According to an embodiment of the present disclosure, a computer implemented method for forecasting server demand includes collecting a historical number of scoring requests from a network using a serverless architecture. A scoring request capacity per server is determined using the historical number of scoring requests. A prediction model predicts a first future value of scoring requests for a first future time span. A current number of servers in a pool of servers handling the scoring requests. Using the prediction model, a determination of whether the current number of servers is capable of handling the first future value of scoring requests for the first future time span is made. In the event the current number of servers is incapable of handling the first future value of scoring requests, one or more additional servers are warmed up. The warmed-up additional servers are added to the pool of servers prior to an arrival of the first future time span.

According to an embodiment of the present disclosure, a computing device configured to forecast server demand includes a processor operating a server usage forecasting engine and a memory coupled to the processor. The memory stores instructions causing the processor to perform acts comprising collecting a historical number of scoring requests from a network using a serverless architecture. A scoring request capacity per server is determined using the historical number of scoring requests. A prediction model predicts a first future value of scoring requests for a first future time span. A current number of servers in a pool of servers handling the scoring requests. Using the prediction model, a determination of whether the current number of servers is capable of handling the first future value of scoring requests for the first future time span is made. In the event the current number of servers is incapable of handling the first future value of scoring requests, one or more additional servers are warmed up. The warmed-up additional servers are added to the pool of servers prior to an arrival of the first future time span.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
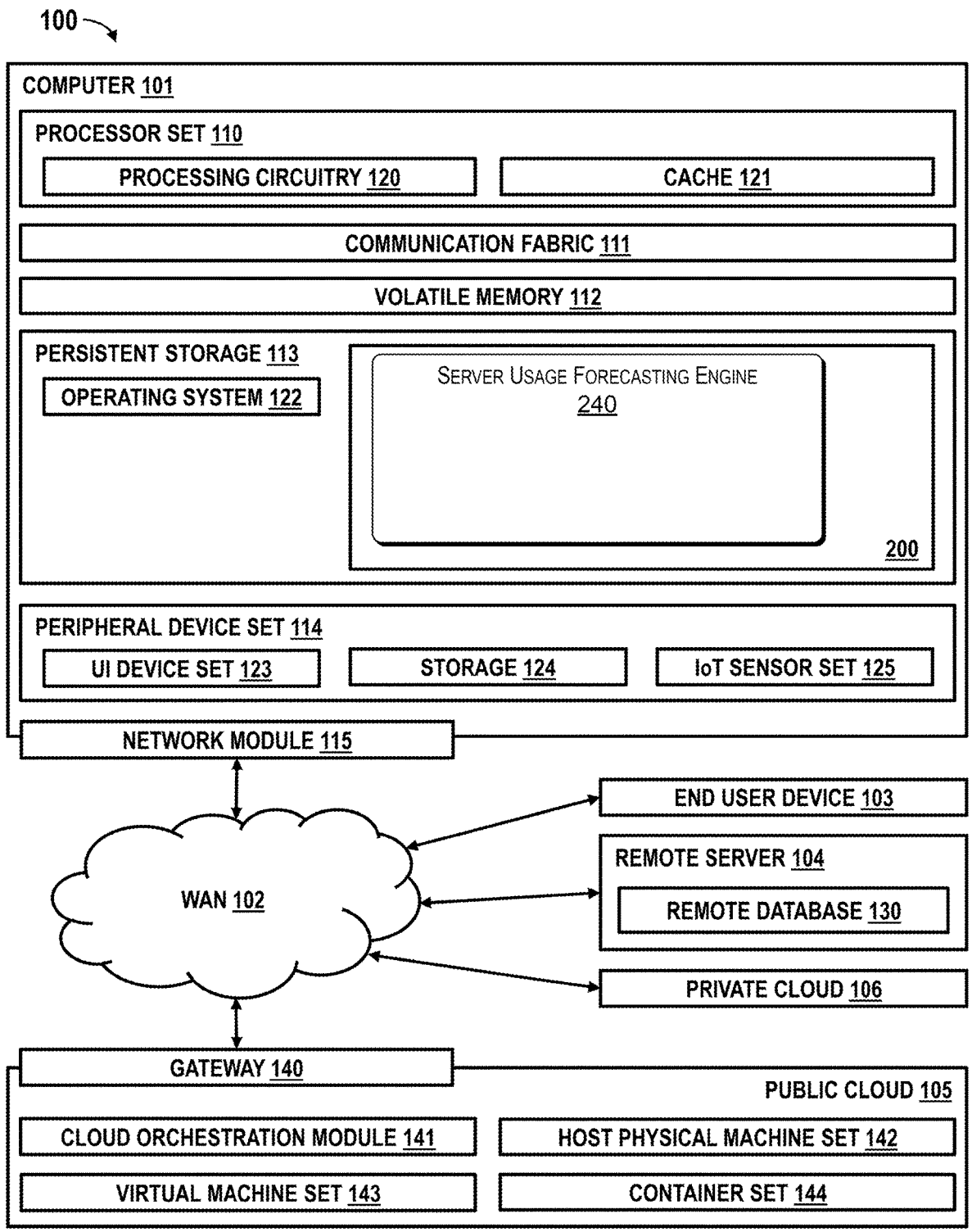
FIG. 1 is a block diagram of a computing environment for forecasting server usage in a serverless network, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Definitions

Serverless Architecture, Serverless Environment, Serverless Model, Serverless Network, as used herein, refer to computing environments where access to server processing is made on an as-needed or on-demand basis. "Serverless" does not mean that a server is not present or used.

Scoring Request, as used herein, refers to a task or transaction requested from a $3^{rd}$ party network entity using a serverless model service.

Time Span, as used herein, refers to a time interval defined by a prediction model for processing data points.

Warm-up or Warming-up, as used, herein refers to bringing a server online or into an operational state ready to handle scoring requests.

Overview

The present disclosure generally relates to forecasting and operating the employment of servers in a computer network using a serverless deployment. While serverless system can be very flexible for end users, the serverless model still has drawbacks. For example, one disadvantage for a serverless system is related to the cold starting of servers. A cold start of a server takes significant time to load a new copy of the server into an operating network. For an AI serving system, cold starts may be a significant weak point because AI model loading involves a significant amount of time. For example, a big model such as an ensemble model may contain thousands of base models that require a long loading time. A deep learning model may include millions of neurons also requiring a long load time. After the model is loaded into memory, there is typically still some initialization work to do before accepting incoming requests. The initialization may be in minutes, but when a model is ready, the scoring time for a single request could be just in milliseconds. The scoring time in this context is the time consumed when making a prediction by a model. For AI applications, scoring time performance is critical, yet the scoring request is typically to be returned within 5 milliseconds, otherwise a prediction in the model will be dropped.

Traditional solutions to accounting for cold starting in networks include for example, maintaining a pool of pre-warmed servers and warming up servers when handshaking occurs between a client computer and a server. As can be seen, the traditional aforementioned solutions, do not take account into the characteristics of serving AI models, and are not feasible for use in networks providing AI services. A pool of pre-warmed servers can be energy wasteful since the servers use a substantial amount of energy just to be maintained to be ready. In addition, a pool of pre-warmed servers may also be insufficient to handle sudden increases in network requests; i.e., the request load exceeds the number of pre-warmed servers. Relying on using a handshaking process may be unsuitable for AI applications since the handshaking time is too short to initialize larger AI models whose initialization time exceeds time needed to handle the task request.

Under the subject technology, the deployment of servers to be allocated in a network may be forecasted using one or more AI models. The teachings described herein use AI to predict changes in network traffic. An AI process forecasts when and how many servers will be needed in a network using a serverless architecture. The AI process may avoid, if not eliminate altogether, cold starts of servers based on the AI forecasts; for example, by warming servers up based on a predicted demand or need for more server usage before accepting incoming requests in the network. Embodiments may use time series analysis to forecast the volume of future potential requests. Based on the time series data, modelling may be used to determine how many servers will be needed to satisfy predicted request traffic in the network. Some embodiments may apply anomaly detection into the analysis process. The anomaly detection may detect those abnormal time points in time series data to identify abnormally increasing requests. The AI process may use a self-learning process that is based on newly observed time series data. The self-learning process may incrementally update AI models to predict the potential requests accurately. As may be appreciated, the teachings herein provide an independent control system for placing servers in a network online. When servers are warmed up for usage in a network, the added servers do not affect the performance of servers that host AI models for the network being managed.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing AI processes and in particular, the processes associated with tracking server usage and predicting traffic discussed herein can be more complex than information that could be reasonably be processed manually by a human user; especially considering how spikes and drops in network usage may change before one or more human minds could calculate such changes in time to process requests in some of the industries described above.

In one embodiment of the present disclosure, a computer program product for forecasting server demand includes one or more computer readable storage media, and program instructions collectively stored on the one or more computer readable storage media. The program instructions include collecting a historical number of scoring requests from a network using a serverless architecture. A scoring request capacity per server is determined using the historical number of scoring requests. A prediction model predicts a first future value of scoring requests for a first future time span. A current number of servers in a pool of servers handling the scoring requests. Using the prediction model, a determination of whether the current number of servers is capable of handling the first future value of scoring requests for the first future time span is made. Upon determining that the current number of servers is incapable of handling the first future value of scoring requests, one or more additional servers are warmed up. The warmed-up additional servers are added to the pool of servers prior to an arrival of the first future time span. It should be appreciated that the use of a prediction model that forecasts future scoring request loads is effective at forecasting the need for additional servers that are warmed-up and ready to process scoring requests when network traffic increases beyond a current capacity of servers in a serverless model. The prediction model allows a system to warm-up servers in anticipation of traffic increases. In addition, when scoring request traffic is expected to be low or decrease, servers may remain offline or removed, thus saving energy and costs.

In one embodiment, which can be combined with a previous embodiment, a number of additional servers needed to handle the first future value of scoring requests is determined. The addition of warmed-up servers to the pool uses the determined number of additional servers. This feature provides the system with the capability to calculate scoring request demand as needed and add only the server capacity that will be needed to handle the scoring request demand, providing an efficient deployment of server resources.

In an embodiment, which can be combined with one or more previous embodiments, a determination is made that the current number of servers in the pool of servers exceeds a capacity to handle the first future value of scoring requests. The servers may be removed from the pool of servers, on the arrival of the first future time span. This feature allows a system to save costs and energy resources by removing servers from the pool once demand in the network drops.

In an embodiment, which can be combined with one or more previous embodiments, a second future value of scoring requests is determined for a second future time span. A determination is made of whether the pool of servers, after the removal of one or more servers, has the capacity to handle the second future value of scoring requests. This feature adds improved efficiency in the system by forecasting whether scoring request demand farther into the future will be readily handled after some servers are removed.

In an embodiment, which can be combined with one or more previous embodiments, in the event the pool of servers does not have the capacity to handle the second future value of scoring requests, the one or more additional servers are reserved to be warmed-up prior to arrival of the second future time span. As may be appreciated, the serverless model service will become more efficient and still reliable when servers are removed but are designated to be warmed-up again later once demand in the network is expected.

In an embodiment, which can be combined with one or more previous embodiments, a warm-up time for the additional servers is determined. The additional servers are warmed-up within the determined warm-up time prior to the arrival of the future time span. This feature ensures that servers may be warmed-up in time to handle an increase in scoring requests but are not necessarily sitting around waiting for requests to arrive.

In an embodiment, which can be combined with one or more previous embodiments, a determination is made whether the current number of servers in the pool of servers is sufficient to handle the future value of scoring requests for the first future time span. This feature avoids removing or adding servers when unnecessary, which saves wear and tear on the servers.

According to another embodiment of the present disclosure, a computer implemented method for forecasting server demand includes collecting a historical number of scoring requests from a network using a serverless architecture. A scoring request capacity per server is determined using the historical number of scoring requests. A prediction model predicts a first future value of scoring requests for a first future time span. A current number of servers in a pool of servers handling the scoring requests. Using the prediction model, a determination of whether the current number of servers is capable of handling the first future value of scoring requests for the first future time span is made. In the event the current number of servers is incapable of handling the first future value of scoring requests, one or more additional servers are warmed up. The warmed-up additional servers are added to the pool of servers prior to an arrival of the first future time span. It should be appreciated that the use of a prediction model that forecasts future scoring request loads is effective at forecasting the need for additional servers that are warmed-up and ready to process scoring requests when network traffic increases beyond a current capacity of servers in a serverless model. The prediction model allows a system to warm-up servers in anticipation of traffic increases. In addition, when scoring request traffic is expected to be low or decrease, servers may remain offline or removed, thus saving energy and costs.

In one embodiment, which can be combined with a previous embodiment, a number of additional servers to handle the first future value of scoring requests is determined. The addition of warmed-up servers to the pool uses the determined number of additional servers. This feature provides the system with the capability to calculate scoring request demand as needed and add only the server capacity that will be needed to handle the scoring request demand, providing an efficient deployment of server resources.

In an embodiment, which can be combined with one or more previous embodiments, a determination is made that the current number of servers in the pool of servers exceeds a capacity to handle the first future value of scoring requests. The servers may be removed from the pool of servers, on the arrival of the first future time span. This feature allows a system to save costs and energy resources by removing servers from the pool once demand in the network drops.

In an embodiment, which can be combined with one or more previous embodiments, a second future value of scoring requests is determined for a second future time span. A determination is made whether the pool of servers, after the removal of one or more servers, has the capacity to handle the second future value of scoring requests. This feature adds improved efficiency in the system by forecasting whether scoring request demand farther into the future will be readily handled after some servers are removed.

In an embodiment, which can be combined with one or more previous embodiments, upon determining that the pool of servers does not have the capacity to handle the second future value of scoring requests, the one or more additional servers are reserved to be warmed-up prior to arrival of the second future time span. As may be appreciated, the serverless model service will become more efficient and still reliable when servers are removed but are designated to be warmed-up again later once demand in the network is anticipated.

In an embodiment, which can be combined with one or more previous embodiments, a warm-up time for the additional servers is determined. The additional servers are warmed-up within the determined warm-up time prior to the arrival of the future time span. This feature ensures that servers may be warmed-up in time to handle an increase in scoring requests but are not necessarily sitting around waiting for requests to arrive.

In an embodiment, which can be combined with one or more previous embodiments, a determination is made whether the current number of servers in the pool of servers is sufficient to handle the future value of scoring requests for the first future time span. This feature avoids removing or adding servers when unnecessary which saves wear and tear on the servers.

According to an embodiment of the present disclosure, a computing device configured to forecast server demand includes a processor operating a server usage forecasting engine and a memory coupled to the processor. The memory stores instructions causing the processor to perform acts comprising collecting a historical number of scoring requests from a network using a serverless architecture. A scoring request capacity per server is determined using the historical number of scoring requests. A prediction model predicts a first future value of scoring requests for a first future time span. A current number of servers in a pool of servers handling the scoring requests. Using the prediction model, a determination of whether the current number of servers is capable of handling the first future value of scoring requests for the first future time span is made. In the event the current number of servers is incapable of handling the first future value of scoring requests, one or more additional servers are warmed up. The warmed-up additional servers are added to the pool of servers prior to an arrival of the first future time span. It should be appreciated that the use of a prediction model that forecasts future scoring request loads is effective at forecasting the need for additional servers that are warmed-up and ready to process scoring requests when network traffic increases beyond a current capacity of servers in a serverless model. The prediction model allows a system to warm-up servers in anticipation of traffic increases. In addition, when scoring request traffic is expected to be low or decrease, servers may remain offline or removed, thus saving energy and costs.

In one embodiment, which can be combined with a previous embodiment, a number of additional servers to handle the first future value of scoring requests is determined. The addition of warmed-up servers to the pool uses the determined number of additional servers. This feature provides the system with the capability to calculate scoring request demand as needed and add only the server capacity that will be needed to handle the scoring request demand, providing an efficient deployment of server resources.

In an embodiment, which can be combined with one or more previous embodiments, a determination is made whether the current number of servers in the pool of servers exceeds a capacity to handle the first future value of scoring requests. The servers are removed from the pool of servers, on the arrival of the first future time span. This feature allows a system to save costs and energy resources by removing servers from the pool once demand in the network drops.

In an embodiment, which can be combined with one or more previous embodiments, a second future value of scoring requests is determined for a second future time span. A determination is made whether the pool of servers, after the removal of one or more servers, has the capacity to handle the second future value of scoring requests. This feature adds improved efficiency in the system by forecasting whether scoring request demand farther into the future will be readily handled after some servers are removed.

In an embodiment, which can be combined with one or more previous embodiments, upon determining that the pool of servers does not have the capacity to handle the second future value of scoring requests, the one or more additional servers are reserved to be warmed-up prior to arrival of the second future time span. As may be appreciated, the serverless model service will become more efficient and still reliable when servers are removed but are designated to be warmed-up again later once demand in the network is anticipated.

In an embodiment, which can be combined with one or more previous embodiments, a warm-up time for the additional servers is determined. The additional servers are warmed-up within the determined warm-up time prior to the arrival of the future time span. This feature ensures that servers may be warmed-up in time to handle an increase in scoring requests but are not necessarily sitting around waiting for requests to arrive.

Example Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one or more storage devices that may include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 includes an example of an environment for the execution of at least some of the computer code involved in performing the inventive methods, such as the improved server deployment code 200. The improved server deployment code 200 may include a server usage forecasting engine 240 that determines how operations among tiles in a neural network are to be distributed (or re-distributed) to balance out the workload. The server usage forecasting engine 240 may operate according to one or more of the methods disclosed in further detail below. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. For the instant disclosure, the processor set 110 includes for example a central processing unit (CPU) and an accelerator. In some embodiments, a different type of processing element may be used instead of the CPU, (for example, a GPU or other process dedicated/specialized unit). Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Example System Architecture

Figure 2:
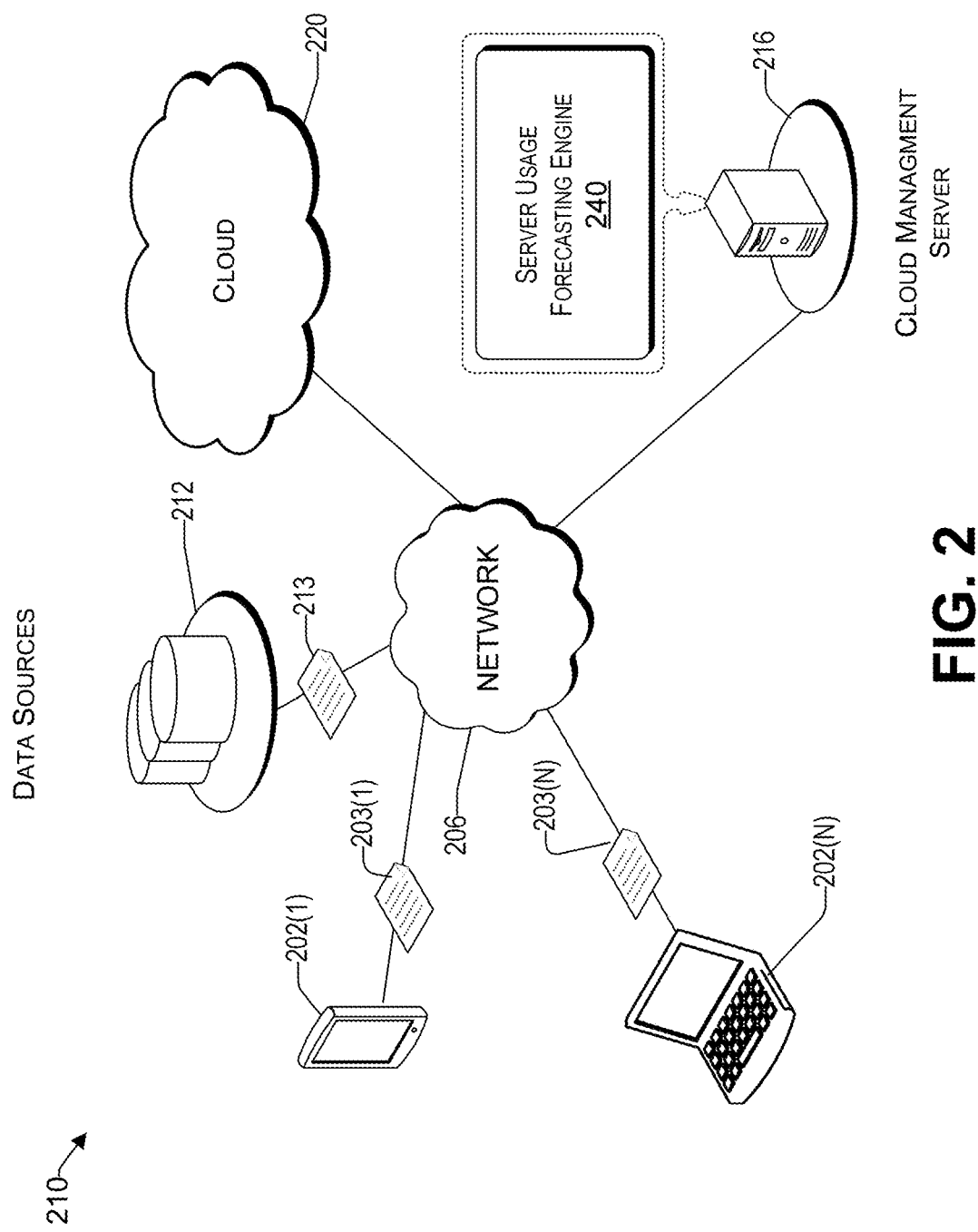
FIG. 2 is a block diagram of an architecture for forecasting server usage in a serverless network, consistent with an illustrative embodiment.

FIG. 2 illustrates an example architecture 210 for deploying servers in a computer network using a serverless model. Architecture 210 includes a network 206 that allows various computing devices 202(1) to 202(N) to communicate with each other, as well as other elements that are connected to the network 206, such as data source 212, a Cloud management server 216, and the Cloud 220. It should be noted that the network 206 is not necessarily the same network being managed for deploying servers into a warmed-up status in anticipation of higher request traffic. In some embodiments, the servers being warmed up or removed from usage may be located in the Cloud 220. The data source 212 may include time series data of request traffic in the Cloud 220, an actual number of servers used at any given time in a subject network, and flagged periods of higher requests in the subject network. The computing devices 202(1) to 202(N) and Cloud management server 216 may operate under the computing environment described above in FIG. 1. The Cloud management server 216 may operate the code 200, including the module for the server usage forecasting engine 240.

The server usage forecasting engine 240 may be configured to predict an impending processing demand for servers to be brought online ("warmed-up") through the Cloud management server 216. As will be described in more detail below, the server usage forecasting engine 240 may determine when a predicted increase in requests through a subject network is expected, determine when the predicted demand for request processing exceeds the load available for a current server deployment in the subject network, and signals to the Cloud management server 216 how many servers to warm-up for a predicted increase in requests. Similarly, when request traffic is expected to decrease, the server usage forecasting engine 240 may determine when the number of active servers in the subject network exceeds the request demand level, and may signal the Cloud management server 216 to take some servers offline.

The network 206 may be, without limitation, a local area network ("LAN"), a virtual private network ("VPN"), a cellular network, the Internet, or a combination thereof. For example, the network 206 may include a mobile network that is communicatively coupled to a private network, sometimes referred to as an intranet that provides various ancillary services, such as communication with various application stores, libraries, and the Internet. The network 206 allows the server usage forecasting engine 240, which is a software program running on Cloud management server 216, to communicate with the data source 212, computing devices 202(1) to 202(N), and/or the Cloud 220, to provide data processing. The data source 212 may include source data being processed for inference and operations to be used in processing the source data, that will be processed under one or more techniques described here. In some embodiments, a data packet 213 may be received by the server usage forecasting engine 240. This data packet 213 can be received by the server usage forecasting engine 240 by either a push operation from the data source 212 or from a pull operation of the server usage forecasting engine 240. In one embodiment, the data processing is performed at least in part on the Cloud 220.

For purposes of later discussion, several user devices appear in the drawing, to represent some examples of the computing devices that may be used by administrative users to interface with the Cloud management server 216 to monitor and control server deployment in a subject network. Aspects of the symbolic sequence data (e.g., 203(1) and 203(N)) may be communicated over the network 206 with the server usage forecasting engine 240 of the Cloud management server 216. Today, user devices typically take the form of portable handsets, smart-phones, tablet computers, personal digital assistants (PDAs), and smart watches, although they may be implemented in other form factors, including consumer, and business electronic devices. While the data source 212 and the server usage forecasting engine 240 are illustrated by way of example to be on different platforms, it will be understood that in various embodiments, the data source 212 and the Cloud management server 216 may be combined. In other embodiments, these computing platforms may be implemented by virtual computing devices in the form of virtual machines or software containers that are hosted in a cloud 220, thereby providing an elastic architecture for processing and storage.

Data Preparation

Figure 3:
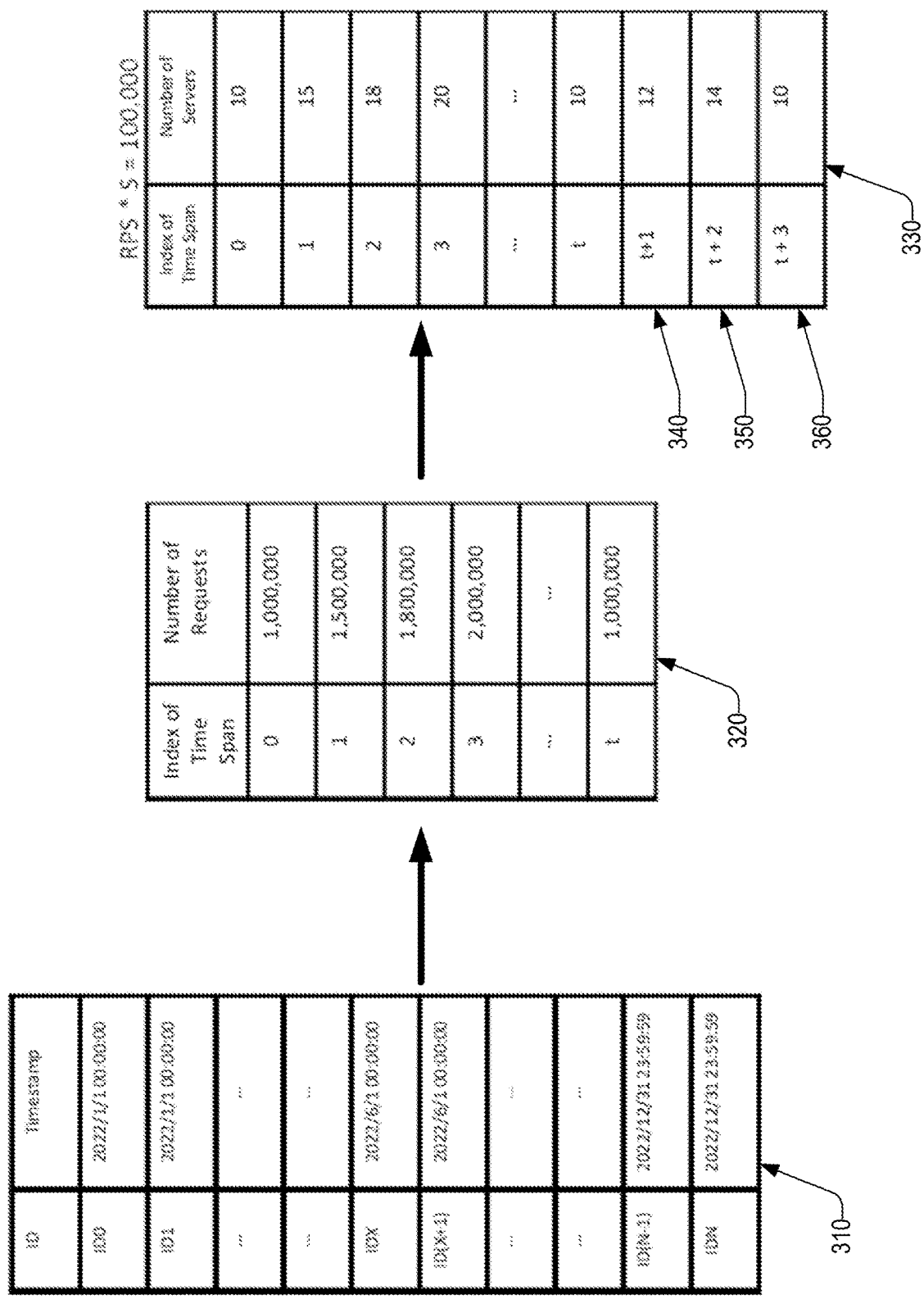
FIG. 3 is a diagrammatic view of data sets being transformed, consistent with an illustrative embodiment.

FIG. 3 illustrates a preparation of data to be used in forecasting a predicted usage of servers in a computer network according to an embodiment. In one embodiment, time series data representing scoring requests in a subject network is used. Data set 310 includes a plurality of data points representing the scoring requests. Each data point may include an identification number and a timestamp showing the time the request was received for processing by the subject network. The required consumption time for servers to process scoring requests may be evaluated for the time needed to change a server from a cold state to a warmed-up state (represented by T seconds when launching a new server). The timestamps for each data point may be used to evaluate the consumption time. The scoring request data points may be aggregated into groups for different time spans (S seconds).

Data set 320 shows the scoring request data points from data set 310 assembled as aggregated groups of requests at different time spans. The aggregated data in data set 320 includes the number of requests for each time span index, where t represents a time span index of a value beyond the first time span index. In the process of defining time spans, S is assumed to =T, since because if S<T, then the time of warm-up needs several spans to finish, which means that forecasts may be not accurate because the process may need to make forecasts across several steps. If S>T, redundant servers may end up being allocated, which may result in resources being wasted.

To transform the data from data sets 310 and 320 to provide data that is evaluated for forecasting deployment of servers, the process may evaluate the capability of a single server based on the RPS (Requests Per Second) the server receives. As an example, individual servers may be assumed to handle 100,000 requests per second. The process may use the number of requests received for each time span index to determine the number of servers needed for each time span.

The dataset 330 includes the number of servers needed in correlation with recorded time span indices. In addition, data set 330 may include forecasted numbers of servers needed for future time span indices 340, 350, and 360. As can be seen, the forecasted demand for servers may increase or decrease based on the historical usage provided by the time series data.

Model Training

The teachings described herein may include a process for training models for time series forecasting models and outlier prediction models. Forecasting models may be trained based on using the transformed datasets (for example, data sets 310, 320, and 330 described above). Embodiments may use various model types for deep learning time series forecasting including for example, exponential smoothing models (many variants), autoregressive integrated moving average (ARIMA), recurrent neural networks (RNN) and DeepAR. Forecasts on accuracy may be evaluated using ensemble models.

Outlier prediction models may be trained based on the transformed dataset. The outlier prediction models may detect potential extreme point outliers. Examples of outlier prediction models include Autoregressive Moving Average (ARMA), Autoencoder, and clustering based approaches.

System Inputs and Initialization

In some embodiments, the data retrieved from scoring requests are used to generate an ensemble time series forecast model and a time series outlier prediction model. As a precursor to forecasting future server usage, some embodiments may declare a pre-warmed-up pool of servers that includes warmed-up servers. Some of the warmed-up servers may not end up being used, some warmed up servers may be removed from the pool, and some removed servers may be restored to an operative state. A subject network of servers may include N warmed-up servers. In an initial state the pool of available servers is empty. In some cases, using the forecast model of the subject teachings to prepare the server pool of warmed-up servers may not be possible for the first two time spans, since generally, forecasting the needed servers in the pool may begin from the next second time span. The prediction of server usage may work from the third span and on. Thus, the index of time span (t) may be assumed to operate from t≥2 (where t starts from 0).

Example Methodology

Figure 4:
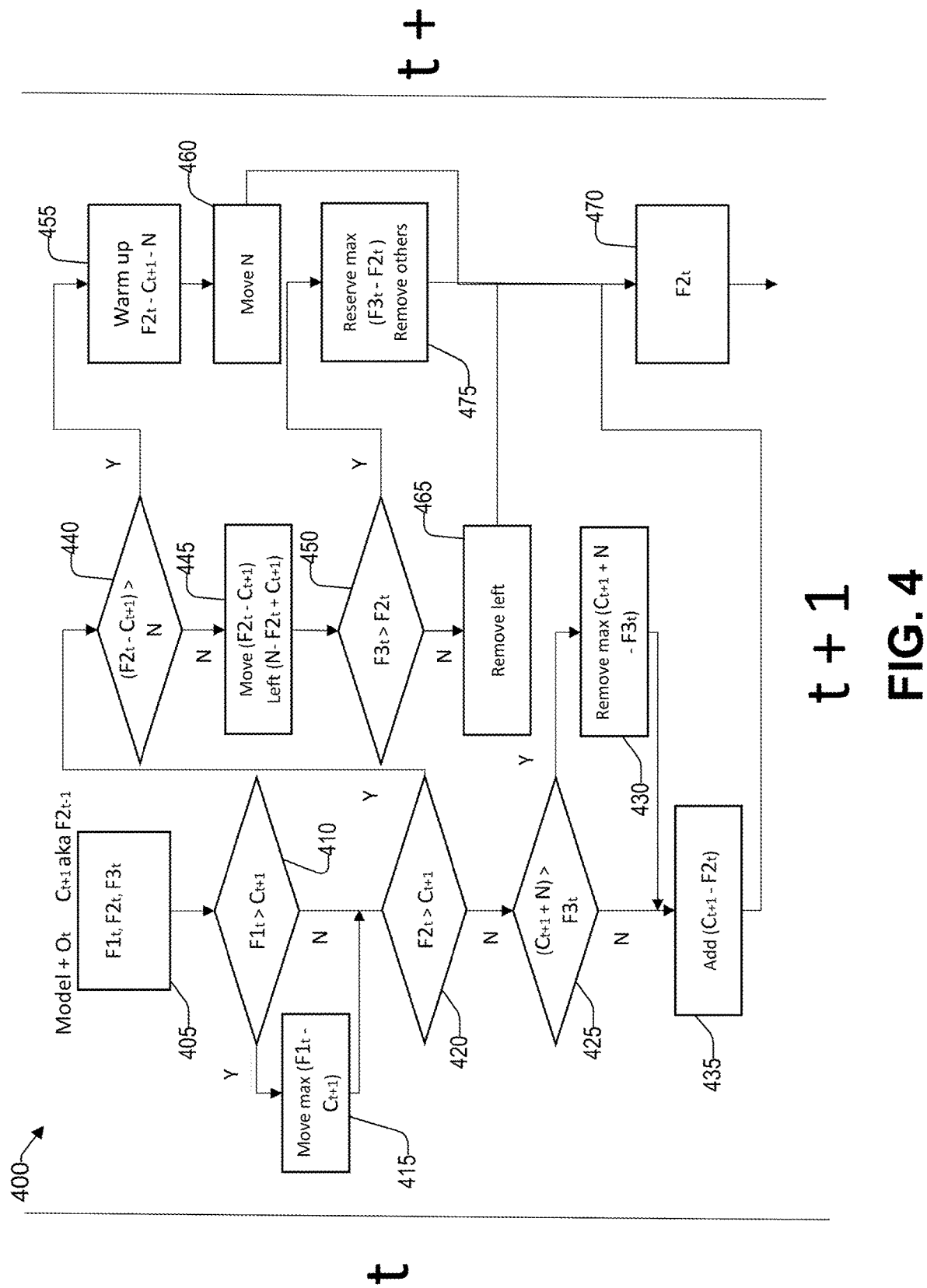
FIG. 4 is a flowchart of a method of forecasting server demand in a serverless network environment according to an embodiment.

Referring now to FIG. 4, a method 400 of forecasting server demand in a network using a serverless architecture is shown according to an embodiment. The method 400 occurs during the time span t+1. Table 1 provides a legend for following how the various time span indices correlate with different server values and phases in the server usage prediction model. There are generally four phases for prediction modelling related to the teachings herein. The first is a monitoring phase that occurs during the initial time span t. In the monitoring phase the server usage forecasting engine 240 may monitor and collect incoming scoring requests from the network.

In the monitoring phase, the observed number of servers ($O_t$) is the current number of servers that are in use and/or warmed-up. The second phase is a preparation phase that occurs during time span t+1. In the preparation phase, new servers (for example, servers that are not part of the currently operational/warmed-up pool) may be added to the pool (i.e., brought online) or may be dropped from the pool (i.e., are redundant or are servers in excess of needed capacity) for the next target phase and potentially for the future phase. In the preparation phase, the number of servers in the predicted pool of servers in use is a forecasted first step value F1t.

The third phase is a target phase. The target phase occurs during time span t+2. In the target phase, the server usage forecasting engine 240 controls prepared servers (i.e., servers warmed-up and ready for use) to handle scoring requests from the subject network. In the target phase, the number of servers in the predicted pool of servers in use is a forecasted second step value $F2_t$.

The fourth phase is a future phase that occurs during time span t+3. In the future phase, the server usage forecasting engine 240 predicts an expected scoring request load for future preparation phases. In the future phase, the number of servers in the predicted pool of servers in use is a forecasted second step value $F3_t$.

TABLE 1

| Index of Time Span | Number of Servers | Phase |
|---|---|---|
| t | Observed value: $O_t$ | Monitoring Phase |
| t + 1 | Forecasted 1st step value: $F1_t$ | Preparing Phase |
| t + 2 | Forecasted 2nd step value: $F2_t$ | Target Phase |
| t + 3 | Forecasted 3rd step value: $F3_t$ | Future Phase |

| t | t + 1 | t + 2 | t + 3 |
|---|---|---|---|
| ↑ | | | |

Referring back to the method 400, the following steps may be performed by the server usage forecasting engine 240 at the end of each time span in preparation of determining forecast value. The total number of scoring requests within the current time span t may be collected. The server usage forecasting engine 240 may compute the required number of servers ($O_t$) needed to process scoring requests for the time span t. Using the observed data Or against the ensemble forecasting model, forecast values are ($F1_t$, $F2_t$, and $F3_t$), may be determined (block 405).

Some embodiments may detect whether any of the observed data Or is an outlier against the outlier prediction model. If so, the three forecasted values ($F1_t$, $F2_t$, and F31) may be modified. Some embodiments include a coefficient (C) for each time span, which may be applied to forecast values of the time span (for example, $F2_t$+=$C2*F2_t$ in association with time span t+2). The coefficients are input parameters with an initial value (for example 1.0), but may be optimized in the following manner. When the observed values for time spans are received, ($O_t+1$, $O_t+2$, $O_t+3$), then $C1=(O_t+1-F1_t)/F1_t$; $C2=(O_t+2-F2_t)/F2_t$, and $C3=(O_t+3-F3_t)/F3_t$. The number of currently warmed-up servers available in a pool is represented by $C_t+1$, which is also equal to $F2_t-1$ (i.e., the forecast value for the phase before the target phase) and will handle the requests in the current span (t+1). In an effective forecast system, the expectation is $C_t+1 \geq O_t+1$ and ($C_t+1-O_t+1$) is minimized.

At block 410, server usage forecasting engine 240 may compare $F1_t$ to $C_t+1$ (which is also $F2_t-1$). In time series theory, the fewer the forecast steps, the more accurate the predictions are because less values are involved in the forecasts. So $F1_t$ is better than $F2_t-1$. If $F1_t > F2_t-1$ (shown as $F1_t > C_t+1$ in block 410), then the server usage forecasting engine 240 may move the max number of pre-warmed-up servers in the pool ($F1_t-C_t+1$) into the real scoring service immediately in block 415, if they are available. If not, then the server usage forecasting engine 240 may prepare for the next time span.

During the next span (t+1), the server usage forecasting engine 240 may prepare servers for time span (t+2). As described above, the span time (t+2) is defined as being equal to the time of a server being warmed up. Assuming the forecast process is very fast, the time consumed for a server warm-up may be ignored. The time consumed by a server to warm-up is significant. The server may need more than ten seconds, even minutes, to warm-up but the forecast process only needs one or several milliseconds. So, compared to the time consumed by a server to warm-up, the forecast process of the time series model can be negligible. In many instances, multiple servers will be warmed up simultaneously, so there should be enough time to warm up new servers for time span (t+2). In other embodiments, where the warm-up time for servers is not negligible, the server usage forecasting engine 240 may warm up any additional servers within the determined warm-up time prior to the arrival of one of the future time spans (t+2 or t+3).

At block 420, the server usage forecasting engine 240 may compare forecasted value $F2_t$ for the target phase to (+1. When $F2_t > C_t+1$, more servers are needed to handle the load of scoring requests for the next span (t+2). Some embodiments may account for servers that have different processing capacity in the same pool. The server usage forecasting engine 240 may designate one server as representing a standard capacity for all servers in the pool. The number of servers forecasted to handle the incoming scoring request load may based on using servers that are a mix of processing capacities. For example, ten servers of the standard capacity and five more servers that have twice the processing capacity of the standard capacity. The server usage forecasting engine 240 may then check the pre-warmed-up pool of servers to determine whether the required number ($F2_t-C_t+1$) of servers needed to handle predicted scoring requests is greater than the current pool size N of operating servers available in the subject network, at block 440. If the predicted scoring request load exceeds the number of warmed-up servers N, the server usage forecasting engine 240 may warm up ($F2_tC_t+1-N$) servers immediately at block 455 and move (at block 460) all pre-warmed-up servers out of the pool and into real-time operation in anticipation of the incoming scoring request load. There will be $F2_t$ servers (at block 470) available at the end of the span (t+1). The pool of warmed-up servers may now by empty for the time span.

In the event, the size of pool $N \geq (F2_t-C_t+1)$, (which means the servers in the pool of warmed-up servers can satisfy the incoming scoring request load), then server usage forecasting engine 240 does not need to warm up any additional servers. The server usage forecasting engine 240 move the number of servers needed to handle the incoming scoring request load ($F2_t-C_t+1$) out of the pool of warmed-up servers at block 445. The remaining number of servers in the pool is represented by ($N-F2_t-C_t+1$).

The server usage forecasting engine 240 may then check for the server needs in the further span (t+3). At block 450, the server usage forecasting engine 240 may determine whether forecasted value for the future phase is greater than the forecasted value for the target phase, ($F3_t>F2_t$). When the future phase is predicted to need more servers to handle the incoming scoring request load, at block 475, the server usage forecasting engine 240 may reserve the max number ($F3_t-F2_t$) of pre-warmed-up servers needed, and delete others if necessary. Otherwise, when the forecasted value of servers needed for the future phase is less than the forecasted value of servers needed for the target phase, ($F3_t \leq F2_t$), all remaining pre-warmed-up servers may be deleted from the pool in the next time span at block 465.

Returning to block 420, if $F2_t \leq C_t+1$, additional servers are not needed for the incoming scoring request load in the target phase (t+2). In some embodiments, the server usage forecasting engine 240 may remove servers in the current pool of available servers. In some embodiments, the server usage forecasting engine 240 may check the predicted server needs for the future phase, time span (t+3). For example, when the scoring request capacity for the number of pre-warmed up servers in the pool exceeds the forecast value for the future phase, $((C_t+1+N)>F3_t)$ (as determined by the server usage forecasting engine 240 at block 425), the server usage forecasting engine 240 may remove the max number of pre-warmed-up servers: ($C_t+1+N-F3_t$) at block 430. Otherwise, the server usage forecasting engine 240 does not make any changes for the pre-warmed-up servers in the pool. The number of active servers ($C_t+1-F2_t$) may be labeled as active, and moved into the pre-warmed-up pool at the end of the current time span (t+1). At this point, there will be $F2_t$ servers available at the end of the preparation phase; time span (t+1). Concurrently, the server usage forecasting engine 240 may record the data pair ($C_t$, $O_t$) for the model evaluation, which will be used by the self-learning model update process.

Self-Learning Model

Some embodiments may include a self-learning model using artificial intelligence. The self-learning model may be part of the server usage forecasting engine 240 or may be a separate engine operated by the Cloud management server 216. The self-learning model may be used to update the time series forecasting models and outlier prediction models. Operation of the self-learning model may include using a defined specified time period that includes N time spans. Model performances may constantly be evaluated for each period based on the historical data collected. To evaluate a model's performance, three parameters may be analyzed. For example, M1 is a metric for a modified accuracy defined as $N\{C_t, \geq O_t\}/N$, which represents a measurement of having a sufficient number of servers to handle an actual scoring request load for a time period. The higher value the better. M2 is a metric representing a lack of servers, defined as Sum $\{(O_t-C_t)$ where if $C_t<O_t\}/N$, which represents a deficiency in servers to handle an actual scoring request load for each time span. The lower value the better. M3 is a metric for servers wasted, defined as Sum $\{(C_t-O_t)$, where if $C_t>O_t\}/N$, which represents the number of servers that are wasted (unused) for each time span based on the actual scoring request load for the period. The lower value the better.

An ideal model is M1=100% and M2=0 and M3=0. For real world practical purposes, embodiments of the self-learning model may include thresholds for these metrics to trigger an update process if a model's performance becomes dissatisfactory. Examples of threshold for each metric include, M1<95%, M2>1, and M3>3, where the metrics M2 and M3 may need more experiments to determine proper values.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer program product for forecasting server demand, the computer program product comprising:
   one or more computer readable storage media, and program instructions collectively stored on the one or more computer readable storage media, the program instructions comprising code having computer readable instructions that, when executed, causes a computer device to carry out a method of forecasting server demand, the method comprising:
   collecting, by a computer processor, a historical number of scoring requests for artificial intelligence (AI) models from a network using a serverless architecture;
   determining, by the computer processor, a scoring request for AI models capacity per server using the historical number of scoring requests for AI models;
   generating, by the computer processor, a prediction model, wherein the prediction model predicts a first future value of scoring requests for AI models for a first future time span;
   determining, by the computer processor, a current number of servers in a pool of servers handling the scoring requests for AI models from the network using the serverless architecture;
   determining, by the computer processor and using the prediction model, whether the current number of servers is capable of handling the first future value of scoring requests for AI models for the first future time span;
   upon determining that the current number of servers is incapable of handling the first future value of scoring requests for AI models:
      warming up, by the computer processor, one or more additional servers; and adding, by the computer processor, the warmed-up additional servers to the pool of servers prior to an arrival of the first future time span.

2. The computer program product of claim 1, wherein the method further comprises determining a number of additional servers to handle the first future value of scoring requests for AI models, wherein the addition of warmed-up servers to the pool uses the determined number of additional servers.

3. The computer program product of claim 1, wherein the method further comprises:
determining whether the current number of servers in the pool of servers exceeds a capacity to handle the first future value of scoring requests for AI models; and
removing one or more servers from the pool of servers, on the arrival of the first future time span.

4. The computer program product of claim 3, wherein the method further comprises:
determining a second future value of scoring requests for AI models for a second future time span; and
determining whether the pool of servers, after the removal of one or more servers, has the capacity to handle the second future value of scoring requests for AI models.

5. The computer program product of claim 4, wherein the method further comprises upon determining that the pool the pool of servers does not have the capacity to handle the second future value of scoring requests for AI models, the program instructions further comprise reserving one or more additional servers to be warmed-up prior to arrival of the second future time span.

6. The computer program product of claim 1, wherein the method further comprises:
determining a warm-up time for the additional servers; and
warming up the additional servers within the determined warm-up time prior to the arrival of the future time span.

7. The computer program product of claim 1, wherein the method further comprises determining whether the current number of servers in the pool of servers is sufficient to handle the future value of scoring requests for AI models for the first future time span.

8. A computer implemented method for forecasting server demand, comprising:
collecting, by a computer processor, a historical number of scoring requests for artificial intelligence (AI) models from a network using a serverless architecture;
determining, by the computer processor, a scoring request capacity per server using the historical number of scoring requests for AI models;
generating, by the computer processor, a prediction model, wherein the prediction model predicts a first future value of scoring requests for AI models for a first future time span;
determining, by the computer processor, a current number of servers in a pool of servers handling the scoring requests for AI models from the network using the serverless architecture;
determining, by the computer processor and using the prediction model, whether the current number of servers is capable of handling the first future value of scoring requests for AI models for the first future time span; and
upon determining that the current number of servers is incapable of handling the first future value of scoring requests for AI models:

warming up, by the computer processor, one or more additional servers; and
adding, by the computer processor, the warmed-up additional servers to the pool of servers prior to an arrival of the first future time span.

9. The method of claim 8, further comprising determining a number of additional servers to handle the first future value of scoring requests for AI models, wherein the addition of warmed-up servers to the pool uses the determined number of additional servers.

10. The method of claim 8, further comprising:
determining whether the current number of servers in the pool of servers exceeds a capacity to handle the first future value of scoring requests for AI models; and
removing one or more servers from the pool of servers, on the arrival of the first future time span.

11. The method of claim 10, further comprising:
determining a second future value of scoring requests for AI models for a second future time span; and
determining whether pool of servers, after the removal of one or more servers, has the capacity to handle the second future value of scoring requests for AI models selecting the locality constraint based on reducing latency in an output of the neural network.

12. The method of claim 11, wherein upon determining that the pool of servers does not have the capacity to handle the second future value of scoring requests for AI models, the method further comprises reserving one or more additional servers to be warmed-up prior to arrival of the second future time span.

13. The method of claim 8, further comprising:
determining a warm-up time for the additional servers; and
warming up the additional servers within the determined warm-up time prior to the arrival of the future time span.

14. The method of claim 8, further comprising determining that the current number of servers in the pool of servers is sufficient to handle the future value of scoring requests for AI models for the first future time span.

15. A computing device configured to forecasting server demand, comprising:
a processor operating server usage forecasting engine; and
a memory coupled to the processor, the memory storing instructions to cause the processor to perform acts comprising:
collecting, by a computer processor, a historical number of scoring requests for artificial intelligence (AI) models from a network using a serverless architecture;
determining, by the computer processor, a scoring request capacity per server using the historical number of scoring requests for AI models;
generating, by the computer processor, a prediction model, wherein the prediction model predicts a first future value of scoring requests for AI models for a first future time span;
determining, by the computer processor, a current number of servers in a pool of servers handling the scoring requests for AI models from the network using the serverless architecture;
determining, by the computer processor and using the prediction model, whether the current number of servers is capable of handling the first future value of scoring requests for AI models for the first future time span; and upon determining that the current number of servers is incapable of handling the first future value of scoring requests for AI models:
- warming up, by the computer processor, one or more additional servers; and
- adding, by the computer processor, the warmed-up additional servers to the pool of servers prior to an arrival of the first future time span.

16. The computing device of claim 15, wherein the instructions cause the processor to perform further acts comprising determining a number of additional servers to handle the first future value of scoring requests for AI models, wherein the addition of warmed-up servers to the pool uses the determined number of additional servers.

17. The computing device of claim 15, wherein the instructions cause the processor to perform further acts comprising:
- determining whether the current number of servers in the pool of servers exceeds a capacity to handle the first future value of scoring requests for AI models; and
- removing one or more servers from the pool of servers, on the arrival of the first future time span.

18. The computing device of claim 17, wherein the instructions cause the processor to perform further acts comprising:
- determining a second future value of scoring requests for AI models for a second future time span; and
- determining whether the pool of servers, after the removal of one or more servers, has the capacity to handle the second future value of scoring requests for AI models selecting the locality constraint based on reducing latency in an output of the neural network.

19. The computing device of claim 18, wherein the instructions cause the processor to perform further acts comprising, upon determining that the pool of servers does not have the capacity to handle the second future value of scoring requests for AI models, the method further comprises reserving one or more additional servers to be warmed-up prior to arrival of the second future time span.

20. The computing device of claim 17, wherein the instructions cause the processor to perform further acts comprising:
- determining a warm-up time for the additional servers; and
- warming up the additional servers within the determined warm-up time prior to the arrival of the future time span.

* * * * *